United States Patent [19]

Siira et al.

[11] Patent Number: 5,457,812
[45] Date of Patent: Oct. 10, 1995

[54] RADIO TEST LOOP HAVING COMMON COMBINER CABLE CONNECTING TRANSMITTERS, SPACED AT $N\lambda/2$ THEREALONG, WITH RECEIVERS, VIA FREQUENCY CONVERTER

[75] Inventors: Anne-Marie Siira, Oulu; Veli-Matti Sarkkä, Oulunsalo; Timo Huovinen, Oulu, all of Finland

[73] Assignee: Nokia Telecommunications Oy, Espoo, Finland

[21] Appl. No.: 81,331

[22] PCT Filed: Dec. 12, 1991

[86] PCT No.: PCT/FI91/00382

§ 371 Date: Aug. 19, 1993

§ 102(e) Date: Aug. 19, 1993

[87] PCT Pub. No.: WO92/12582

PCT Pub. Date: Jul. 23, 1992

[30] Foreign Application Priority Data

Dec. 28, 1990 [FI] Finland ..................................... 906449

[51] Int. Cl.⁶ .................................................. H04B 17/00
[52] U.S. Cl. .......................... 455/67.4; 455/103; 455/115; 455/226.1; 455/279.1; 333/125; 333/132
[58] Field of Search .................................... 455/126, 67.1, 455/67.4, 115, 226.1, 226.2, 226.3, 226.4, 279.1, 103, 107; 333/125, 127, 128, 136, 137, 134, 132, 100

[56] References Cited

U.S. PATENT DOCUMENTS

| | | | |
|---|---|---|---|
| 3,737,782 | 6/1973 | Pierce | 325/363 |
| 4,048,564 | 9/1977 | Gleeson, Jr. | 325/67 |
| 4,175,257 | 11/1979 | Smith et al. | 333/137 X |
| 4,785,267 | 11/1988 | Covill | 333/125 |
| 4,825,175 | 4/1989 | Tsuda et al. | 333/136 X |
| 4,875,024 | 10/1989 | Roberts | 333/127 |
| 5,283,540 | 2/1994 | Myer | 333/136 |

OTHER PUBLICATIONS

Wo, A1, 9119363, Dec. 1991, see abstract.

Patent Abstracts of Japan, vol. 13, No. 386, E812, abstract of JP 01–135138, published May 1989.

*Primary Examiner*—Reinhard J. Eisenzopf
*Assistant Examiner*—Philip J. Sobutka
*Attorney, Agent, or Firm*—Cushman Darby & Cushman

[57] ABSTRACT

An arrangement for forming a radio test loop in a radio unit comprising several radio transmitters and radio receivers wherein each radio transmitter comprises a test signal output, which is adjustable during an operation of testing the radio transmitter, from a high-impedance state to a low-impedance state for outputting a test signal derived from a signal transmitted by the radio transmitter to a frequency converter for conversion to the receiving frequency before looping to the respective radio receiver. To reduce cable-laying required for the test loop, the test signal outputs of all the radio transmitters are connected with spacings of approximately $n\lambda/2$ to a common combiner cable connected to the input of the frequency converter, where $\lambda$=the wave length at the transmitting frequency and n= 1, 2, 3, . . . .

4 Claims, 1 Drawing Sheet

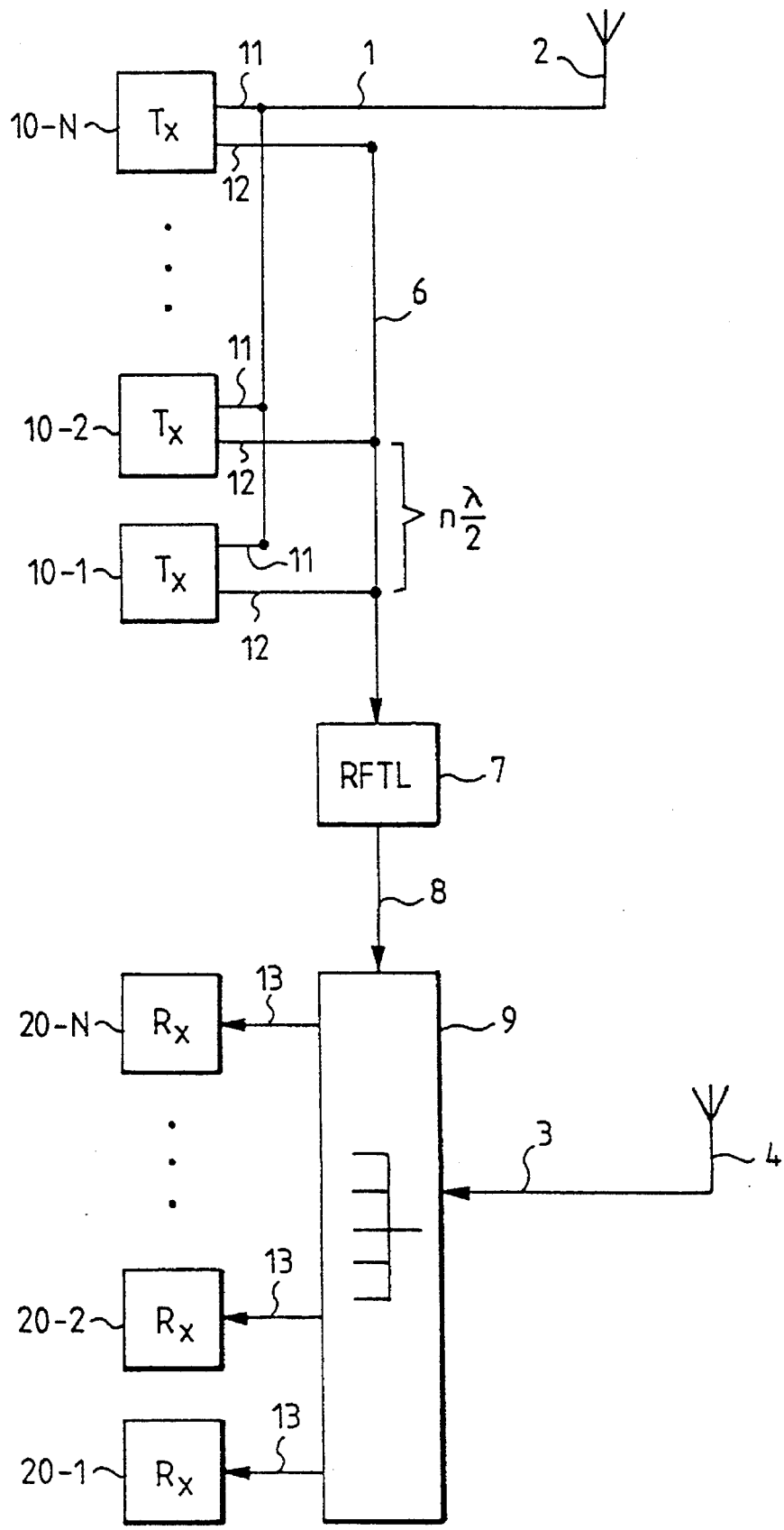

RADIO TEST LOOP HAVING COMMON COMBINER CABLE CONNECTING TRANSMITTERS, SPACED AT Nλ/2 THEREALONG, WITH RECEIVERS, VIA FREQUENCY CONVERTER

BACKGROUND OF THE INVENTION

The invention relates to an arrangement for establishing a radio test loop in a radio unit comprising several radio transmitters and several radio receivers, wherein each radio transmitter comprises a test signal output which is adjustable during an operation of testing the radio transmitter from a high-impedance state to a low-impedance state, for outputting a test signal derived from a signal transmitted by the radio transmitter to a frequency converting means for conversion to the receiving frequency before looping to the respective radio receiver.

The operation of the radio sections of a radio transceiver can be supervised and tested by establishing a so-called radio test loop, that is, by feeding back a test signal derived from a radio-frequency test signal transmitted by the radio transmitter to the radio receiver after converting it to the receiving frequency. Radio units comprising several radio transceiver pairs, such as the base stations of cellular mobile radio systems, usually employ a single frequency converter to which test signals from the different transmitters are applied in successive turns. A separate cable is provided between the test signal output of each transmitter and a special combiner unit which combines the test signal outputs to the single supply line of the common frequency converter. When the number of transceiver pairs in the radio unit is high, such as 16 or 32, the realization of the radio test loop by this conventional technique requires a significant number of printed circuit boards and cables and, as a result, a substantial amount of space.

SUMMARY OF THE INVENTION

The object of the present invention is to provide a radio test loop arrangement which is simpler and requires less space than previously.

This is achieved by means of an arrangement wherein according to the invention the test signal outputs of all the radio transmitters are connected with spacings of approximately nλ/2 to a common combiner cable connected to the input of the frequency converter, where λ=the wave length at the transmitting frequency and n=1, 2, 3, . . . .

The basic idea of the invention is that when a certain number of high-impedance test signal outputs are combined by the common combiner cable by utilizing a so-called half-wave-length technique, each high-impedance test output appears to present a high impedance to every other test output and so the test outputs do not load each other. In the test situation, solely the low impedance of the test signal output of the radio transmitter being tested loads the input of the frequency converter coupled to the combiner cable. By means of the invention, a single cable can replace the separate combiner means and the great number of cables used previously, and so the invention enables considerable savings in space and costs.

BRIEF DESCRIPTION OF THE DRAWING

In the following, the invention will be described in greater detail by means of an illustrating embodiment with reference to the attached drawing, wherein:

The sole figure shows a block diagram of a radio unit comprising a radio test loop realized in accordance with the principles of the invention.

DETAILED DESCRIPTION OF A PREFERRED EMBODIMENT

The radio unit shown in the figure comprises several radio transmitters 10-1, 10-2, . . . , 10-N and several radio receivers 20-1, 20-2, . . . , 20-N. For the sake of clarity, only three radio transmitters and three radio receivers are shown in the figure, but their number can be considerably greater, e.g. 16 or 32. Power outputs 11 in the radio transmitters 10 are coupled to a common antenna line I for supplying radio-frequency (RF) transmission power to a transmitting antenna 2. RF power received by a receiving antenna 4, in turn, is supplied through an antenna line 3 to a branching means 3 which distributes the signal received from the antenna 4 to the radio receivers 20.

The operation of the radio sections of the radio unit is supervised and tested by establishing a so-called radio test loop, that is, by feeding back a test signal derived from a transmitting-frequency signal transmitted by each radio transmitter 10, in successive turns, to the respective radio receiver 20 after conversion to the receiving frequency. For this purpose, each radio transmitter 10 comprises a test signal output 12 having a relatively low output impedance (e.g. 50 Ω) when the radio transmitter 10 is being tested and when a test signal derived from an outbound signal is connected to the test signal output 12. When the radio transmitter 10 is not being tested, the test signal output 12 has a very high output impedance (e.g. 10 kΩ) as compared with the output impedance in the test state. The test outputs 12 of the radio transmitters 10 are connected to a common combiner cable 6 to which the input of a radio test loop unit (RFTL) 7 is also connected. The internal structure of the radio test loop unit 7 may vary from one radio system to another; however, it always contains at least a frequency converter or other similar device for converting a transmission-frequency test signal to the receiving frequency. Additionally, the frequency converter can be tuned to the transmitting and receiving frequency of the particular radio transmitter and radio receiver pair being tested. The test signal converted to the receiving frequency and present at the output 8 of the radio test loop unit 7 is applied through the branching means 9 to the receivers 20. The receiver 20, to the receiving frequency of which the test signal has been converted, detects the test signal and the desired measurements can be performed on the detected signal to determine the condition of the radio sections.

The test signal outputs 12 of the radio transmitters 10 are connected to a common combiner cable 6 in such a way that the length of the supply cable 6 between the test outputs 12 of two radio transmitters 10 is about nλ/2, where λ is the wave length at an average transmitting frequency and n=1, 2, 3, . . . . In other words, the distance between any two outputs 12 is half the wave length or a multiple of half the wave length, whereby the high output impedance of the test signal output 12 of each radio transmitter 10 appears in the outputs 12 of the other transmitters 10 as a high impedance and does not load them. In the course of testing the transmitters in successive turns, solely the low output impedance (50 Ω) of the test signal output of the transmitter being tested appears in the input of the radio test loop unit 7 connected to the combiner cable 6.

The figure and the description related to it are only intended to illustrate the invention. In its details, the arrangement of the invention may vary within the scope of the attached claim.

We claim:

1. A radio test loop, comprising:

a plurality of radio transmitters, each arranged to supply RF transmitting power to a transmitting antenna at a respective frequency at a relatively high output impedance;

a plurality of radio receivers, each arranged to receive RF power received by a receiving antenna as a result of radio transmissions by respective ones of said radio transmitters;

each said radio transmitter, in addition to having an antenna line for supplying said RF transmitting power therefrom, also having a test signal output line arranged to supply RF transmitting power at a respective frequency at a relatively low output impedance as a respective test signal;

a radio test loop unit including a frequency converter for converting each said test signal to a respective receiving frequency for each said radio receiver, for permitting each said radio receiver to be tested in succession in respect to each said radio transmitter, as respective pairs;

said radio test loop unit having an input for receiving said test signals, and an output effectively connected to said radio receiver for providing RF power input thereto as a result of test signals being supplied by respective ones of said radio transmitters; and a common combiner cable serially connecting each said test signal output line at a respective connection with said input of said radio test loop unit with a spacing of $n\lambda/2$ between each said connection, wherein $\lambda$ is the wave length at an average transmitting frequency of each said test signal, and n is a small integer, whereby only the respective relatively low output impedance of the test signal of a respective said transmitter which is being tested appears in said input of said radio test loop unit.

2. The radio test loop of claim 1, wherein:

said relatively low output impedance is about 50 $\Omega$, said relatively high output impedance is about 10 k$\Omega$, and said small integer is on the order of 1,2,3.

3. The radio test loop of claim 1, wherein:

all of said antenna lines are combined to supply a single said transmitting antenna.

4. The radio test loop of claim 1, further including a distributor effectively providing branching between a single said receiving antenna and an input to each said radio receiver;

said output of said radio test loop unit being effectively connected as an input to said distributor.

\* \* \* \* \*